3,310,571
METHOD OF PREPARING OXAZOLINES

Rogers F. Lambert, Radford, Va., assignor to Thiokol Chemical Corporation, Bristol, Pa., a corporation of Delaware
No Drawing. Filed Aug. 29, 1966, Ser. No. 575,561
13 Claims. (Cl. 260—307)

This invention relates to the preparation of oxazolines and thiazolines and, more particularly, to a one-step process for preparing these compounds in good yield and substantially free of contaminants.

This application is a continuation-in-part of my copending application, Ser. No. 465,726, filed June 21, 1965, now abandoned.

The 2-oxazolines and 2-thiazolines made by the process disclosed in the following specification are known compounds which have utility as intermediates in the production of chemical modifying agents. For example, as disclosed in U.S. Patent No. 3,052,669, issued to G. Gavlin on Sept. 4, 1962, the physical characteristics of cellulosic materials and resin compounds are advantageously modified by imines formed from 2-oxazolines which are prepared by the process disclosed herein.

Presently, the favored method of preparing the oxazolines is through the dehydration of certain Beta hydroxy amides. The generic preparation from B-hydroxamides is shown below:

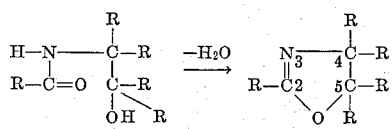

Unfortunately, many of the 2-oxazolines and the corresponding thiazolines, particularly those of low molecular weight, are water soluble, and because of this the products are difficult to prepare in the anhydrous state using thermal dehydration. Furthermore, when the water released during the reaction is removed by distillation, less volatile contaminants, such as salts which are contributed by the starting material, are concentrated during distillation. To avoid this purification problem, dehydrating agents have been used to remove the water rather than heat. However, most of these agents are acidic in nature and produce the product in the form of salt. This requires an additional step to produce the product in the free state. Another deficiency of the above process is that the starting materials are difficult to obtain and expensive. Because of the shortcomings of the prior art method, an improved process for preparing 2-oxazolines and 2-thiazolines would be desirable. Ideally, the preparative process would produce the products in the free state, free of water and metallic contaminants, from readily available and inexpensive starting materials under relatively mild reaction conditions. A process with these attributes would be a substantial advance in the art.

Thus it is an object of this invention, among others, to directly prepare oxazolines and thiazolines in good yield.

A further object of this invention is to prepare the above products in the anhydrous state in the form of their free bases.

Still another object of this invention is an improved process for preparing oxazolines and thiazolines having substituents in the 2,4, and 5 positions.

Additional objects of this invention are the preparation of the above products from readily available and inexpensive starting materials free from contaminants and impurities.

Other objects will become obvious to those skilled in the art after a more thorough perusal of this application.

The objects described above, among others, are accomplished by the thermal process described below.

In practice, an amidine reactant is contacted with an oxirane or thiirane reactant to form a reaction mixture including the heterocyclic product. The product is freed from starting materials and then generally vacuum distilled or recrystallized to produce the purified product.

The generic process is set forth below:

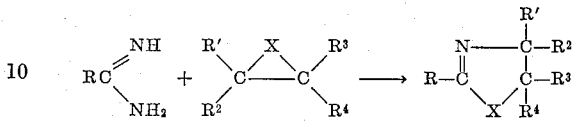

wherein R, R', R², R³ and R⁴ which can be the same or different at any given time are selected from the group consisting of hydrogen, saturated aliphatic, unsaturated aliphatic, halogenated saturated aliphatic, nitrated saturated aliphatic, nitrated and halogenated saturated aliphatic halogenated unsaturated aliphatic, nitrated unsaturated aliphatic, nitrated and halogenated unsaturated aliphatic, aromatic, saturated aliphatic substituted aromatic, unsaturated aliphatic substituted aromatic, halogenated aromatic, nitrated aromatic, nitrated and alkylated aromatic, and nitrated and halogenated aromatic.

The preferred process embodiments are those in which oxazolines having saturated aliphatic, unsaturated aliphatic, perhalogenated saturated aliphatic, aromatic and halogenated aromatic substitutents are prepared. In these preferred embodiments the aliphatic radicals contain from 1 to 6 carbon atoms.

The following oziranes and thiiranes represent only a partial listing of the satisfactory reactants which can be used: ethylene oxide, propylene oxide, the butylene oxides, the pentylene oxides, the hexylene oxides, the heptylene oxides, the octylene oxides, the nonylene oxides, the decylene oxides, the aromatic epoxides, the halogenated aromatic epoxides, the nitrated epoxides and the halogenated and nitrated aromatic epoxides among others. Specific illustrations of aromatic epoxides are styrene oxide, p-nttrostyrene oxide, diphenyl ethylene oxide and the like. Among the many thiiranes are the following episulfides (or sulfides): styrene sulfide, diphenyl ethylene sulfide, p-nitrostyrene sulfide, ethylene sulfide, propylene sulfide, the butylene sulfides, the pentylene sulfides, the hexylene sulfides, the heptylene sulfides, the octylene sulfides, the nonylene sulfides, and the decylene sulfides, among others, as well as the corresponding aliphatic, halogenated, and nitrated unsaturated aliphatic and aromatic derivatives.

The amidine reactants of this invention can be saturated or unsaturated, halogenated and/or nitrated, aliphatic, aromatic or heterocyclic in structure. Typical generic reactants which can be used are the following: acetamidine, ethylamidine, the propylamidines, the butylamidines, the pentylamidines, the hexylamidines, the heptylamidines, the octylamidines, the nonylamidines and the decylamidines as well as their corresponding unsaturated derivatives.

Specific amidines include propionamidine, isobutyramidine, n-butyramidine, perfluorobutyramidine, perchlorobutyramidine, perbromobutyramidine, chlorobutyramidine, n-pentylamidine, isopentylamidine, benzamidine, p-methylbenzamidine, p-chlorobenzamidine, p-nitrobenzamidine, among many others.

The amidine, oxirane and thiirane reactants are known compounds, many of which are available comercially. Alternatively, these reactants can be prepared according to methods set forth in the chemical literature such as Chemical Abstracts and Organic Synthesis.

The inventive reaction is particularly advantageous in that reaction conditions are flexible and can be varied in many respects. For example, while ordinarily no solvent is required, if desired, numerous inert solvents can be used. These include alkanes, cycloalkanes, petroleum ether, toluene, xylene, chlorobenzene, etc. Moreover, while the reaction proceeds quite readily at room temperature, higher temperatures can be used if convenient. Thus, the temperature can range from about 0° C. to about 200° C. However, the preferred temperature range is from about 20° C. to about 100° C., since lower temperatures unduly prolong reaction time while temperatures much above 100° C. increase the likelihood of competing side reactions and/or degradation. Ordinarily the reaction is carried out at near atmospheric pressure but superatmospheric pressure can be used if desired. For instance, superatmospheric pressures are used whenever the reactants are recalcitrant to the production of good yields under the ordinary reaction conditions of moderate temperatures and near atmospheric pressures. When these higher pressures are used, an autoclave, pressurized bottle, bomb or stirring means are employed as the reaction vessel. Ordinarily, however, the reaction proceeds quite readily at near atmospheric pressures and no need for superatmospheric pressures exists.

The preferred ratio of starting materials is about 1 part by weight of amidine reactant for each part by weight of oxirane of irane reactant used. This ratio is not critical and product has been obtained when this ratio is exceeded by 50% or more. In most instances an excess of the irane reactant over that required by stoichiometry is used.

The time required to form the intermediate adduct can vary considerably since it is dependent upon the particular reactants used, the reaction temperature and whether the reaction is run at superatmospheric pressures. However, in most instances the adduct is formed within about 1 to 48 hours or more, with 2-24 hours being typical.

The purification of the heterocyclic products of this invention can be acomplished in a number of ways according to convenience, the particular reaction and the equipment available. Usually purification is effected after stripping off the excess reactants and optional inert solvent from the reaction mixture. The purification of the product is commonly done by distilling under reduced pressures of 10 mm. of mercury or less. Alternatively, the products can be crystallized from a variety of inert solvents such as the alkanes, the cycloalkanes, aromatics and halogenated aromatics, among others. Generally, the method of purification is not important and any of the methods used to purify oxazolines and thiazolines in the literature can be employed.

To more clearly indicate the scope of the inventive process, the following illustrative embodiments are submitted. The first group of embodiments show the preparation of oxazolines while the second group shows the preparation of thiazolines.

In one embodiment of this invention, 10 parts by weight of butyramidine and 10 parts by weight of 2,3-pentylene oxide are heated with stirring at about 90° C. for 12 hours in a reaction vessel fitted with a reflux condenser and heating means. The excess 2,3-pentylene oxide is removed by distillation. The residue is distilled at atmospheric pressure and the product collected in a cooled receiver. A purified portion of 2-propyl-4-methyl-5-ethyl-$\Delta^2$ oxazoline is obtained.

In another embodiment, 4 parts by weight of acetamidine and 4 parts by weight of ethylene oxide are stirred together at room temperature for 6 hours in an appropriate reaction vessel. The volatiles are evaporated off and the product distilled at atmospheric pressure to produce 2-methyl-$\Delta^2$ oxazoline which is collected in a cooled receiver.

In an additional embodiment of this invention, 7 parts by weight of butyramidine and 12 parts by weight of propylene oxide are stirred at 50° C. for 5 hours. The excess epoxide is distilled off and the product is purified by distilling under reduced pressure. The product 2-propyl-5-methyl-$\Delta^2$ oxazoline is obtained in 80% yield. The product boils at 78–81° C./45 mm. and has an index of refraction of $n_D^{20}$ of 1.4355.

In another embodiment, 7 parts by weight of butyramidine and 18 parts by weight of 1,2-butylene oxide are heated to 40° C. for 5 hours. The excess epoxide is removed and the product 2-propyl-5-ethyl-$\Delta^2$ oxazoline is obtained in 82% yield. The product boils at 75–78° C./15 mm., $n_D^{20}$ of 1.4393.

In yet another embodiment, a solution of 1 part by weight of butyramide and 1 part of ethylene oxide in 5 parts by weight of toluene is stirred for 8 hours at about 25° C. The unreacted reactants and volatiles are evaporated off and the residue distilled under vacuum. The product is 2-propyl-$\Delta^2$ oxazoline.

In still a further embodiment, twenty-one (21) parts by weight of benzamidine and twenty-six (26) parts by weight of ethylene oxide are dissolved in 100 parts by weight of benzene, and the mixture is stirred at 60° C. for 12 hours. The benzene is removed and the residue is distilled at 2 mm. pressure. The product produced is 2-phenyl-$\Delta^2$ oxazoline.

By use of the aforedescribed procedures the following additional embodiments are prepared:

A mixture of 6.8 g. butyramide and 9.1 g. of styrene oxide is reacted for 2 days at room temperature. N-(2-hydroxy-2-phenylethyl) butyramide, M.P. 108–109° C. is obtained. This is heated under a vacuum of 1 mm. to give 2-propyl-5-phenyl-$\Delta^2$ oxazoline, B.P. 124° C. (3 mm.). The yield is 45%.

A mixture of 8.6 g. of butyramidine and 14.4 g. of cis-2,3-butylene oxide is heated at 75° C. for 20 hours. The product, trans-2-propyl-4,5-dimethyl-$\Delta^2$ oxazoline, is obtained by distillation, B.P. 69° C. (30 mm.) $n_D^{20}$ 1.4262. The yield is 42%.

A similar mixture of butyramidine and trans-2,3-butylene oxide is heated for 5 hours in a pressure vessel at 100° C. Distillation under vacuum gives 60% yield of cis-2-propyl-4,5-dimethyl-$\Delta^2$ oxazoline, B.P. 77° C. (32 mm.), $n_D^{20}$ 1.4362.

A mixture of 10.6 g. of perfluorobutyramidine and 6 g. of ethylene oxide is heated for 2 hours at 100° C. in a pressure vessel. Distillation of the mixture gives 2-perfluoropropyl-$\Delta^2$ oxazoline, B.P. 138° C. The yield is 75%.

A mixture of 1.5 parts p-nitrostyrene oxide and 1 part butyramidine is heated for 4 hours in benzene and reflux temperature. Evaporation of the solvent produces 2-propyl-5-(p-nitrophenyl)-$\Delta^2$ oxazoline, M.P. 69° C. The yield is 40%.

A mixture of 1 part butyramidine and 2 parts tetramethylethylene oxide is heated at 110° C. in a pressure bottle for 4 hours. Distillation of the mixture gives 2-propyl-4,4,5,5-tetramethyl-$\Delta^2$ oxazoline in 50% yield.

Further embodiments are: distilling the reaction mixture of styrene oxide (10 parts by weight) and hexanoamidine (7 parts by weight) to produce 2-amyl-5-phenyl-$\Delta^2$ oxazoline, the preparation of trans-2-methyl-4,5-dimethyl-$\Delta^2$ oxazoline by vacuum distilling the reaction mixture obtained by reacting 8 parts by weight of acetamidine and 15 parts by weight of cis-2,3-butylene oxide in a pressurized reactor, 2-perbromopropyl-$\Delta^2$ oxazoline by distilling the reaction mixture obtained by reacting 10 parts by weight of perbromobutyramidine and 6 parts by weight of ethylene oxide, 2-butyl-5-(p-nitrophenyl)-$\Delta^2$ oxazoline by evaporating the benzene reaction solution, obtained by reacting 2 parts by weight of p-nitrostyrene oxide and 1 part by weight of pentanoamidine, and 2-ethyl-4,4,5,5-tetramethyl-$\Delta^2$ oxazoline prepared by distilling the reaction mixture obtained by contacting 2 parts by weight propionamidine and 4 parts by weight of tetramethylethylene oxide in a pressurized reactor at 110° C. for 6 hours.

The next group of embodiments are illustrative of the inventive concept when a thiirane (episulfide) is used as a reactant. The products in these instances are thiazolines.

In one embodiment of this invention, 1 part by weight of butyramidine is added to 1 part by weight of ethylene episulfide and the mixture is heated to 50° C. for 8 hours. The volatiles are stripped off and the reaction residuum vacuum distilled to yield 2-propyl-$\Delta^2$ thiazoline.

In another embodiment, 7 parts by weight of acetamidine, 12 parts by weight of propylene episulfide and excess benzene are heated at 60° C. for 12 hours. The benzene volatiles are distilled off and the reaction residue vacuum distilled to yield 2-methyl-5-methyl-$\Delta^2$ thiazoline.

In still another embodiment, 7 parts by weight of butyramidine and 18 parts by weight of 1,2-butylene episulfide are heated together with stirring for 12 hours. The volatiles are evaporated off and the residuum vacuum distilled to produce 2-propyl-5-ethyl-$\Delta^2$ thiazoline.

As the foregoing embodiments indicate, numerous changes and modifications can be made in the reaction conditions, reactants and the like without departing from the inventive concept. The metes and bounds of this invention can best be described by the claims which follow.

What is claimed is:

1. A process for preparing 5 membered heterocyclic products included within the formula:

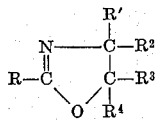

comprising the steps of contacting an amidine reactant of the formula:

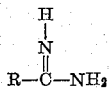

with an epoxide reactant of the formula:

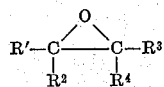

wherein R is selected from the group consisting of saturated unsubstituted aliphatics with up to 5 carbon atoms, perfluoro-substituted aliphatics with up to 3 carbon atoms, and unsubstituted phenyl, and R', R², R³ and R⁴ are selected from the group consisting of hydrogen, saturated unsubstituted aliphatics with up to 2 carbon atoms, unsubstituted phenyl, and nitro-substituted phenyl, until the heterocyclic product of the formula described above is formed, and isolating the product contained therein.

2. A process for preparing 5 membered heterocyclic products of the formula:

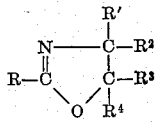

comprising the steps of contacting an amidine of the formula:

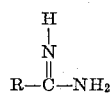

with an epoxide reactant of the formula:

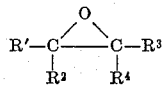

wherein R is selected from the group consisting of saturated aliphatics with up to 5 carbon atoms, perfluoro-substituted aliphatics with up to 3 carbon atoms, and unsubstituted phenyl, and R', R², R³ and R⁴ are selected from the group consisting of hydrogen, unsaturated phenyl and nitro-substituted phenyl at a temperature ranging between about 10–100° C., until the heterocyclic product of the formula described above is formed, and isolating the product contained therein.

3. The process of claim 2 wherein the amidine is acetamidine.

4. The process of claim 2 wherein the amidine is n-propionamidine.

5. The process of claim 2 wherein the amidine is butyramidine.

6. The process of claim 2 wherein the amidine reactant is butyramidine and the epoxide reactant is ethylene oxide.

7. The process of claim 2 wherein the amidine reactant is butyramidine and the epoxide reactant is propylene oxide.

8. The process of claim 2 wherein the amidine reactant is butyramidine and the epoxide reactant is a butylene oxide.

9. The process of claim 2 wherein the amidine reactant is perflurobutyramidine and the epoxide is ethylene oxide.

10. The process of claim 2 wherein the amidine reactant is butyramidine and the epoxide is styrene oxide.

11. The process of claim 2 wherein the amidine reactant is butyramidine and the epoxide is tetramethylethylene oxide.

12. The process of claim 2 wherein the amidine reactant is butyramidine and the epoxide is p-nitro-styrene oxide.

13. The process of claim 2 wherein the amidine reactant is butyramidine and the epoxide is 1,2-butylene oxide.

No references cited.

ALEX MAZEL, *Primary Examiner.*

R. J. GALLAGHER, *Assistant Examiner.*